UNITED STATES PATENT OFFICE.

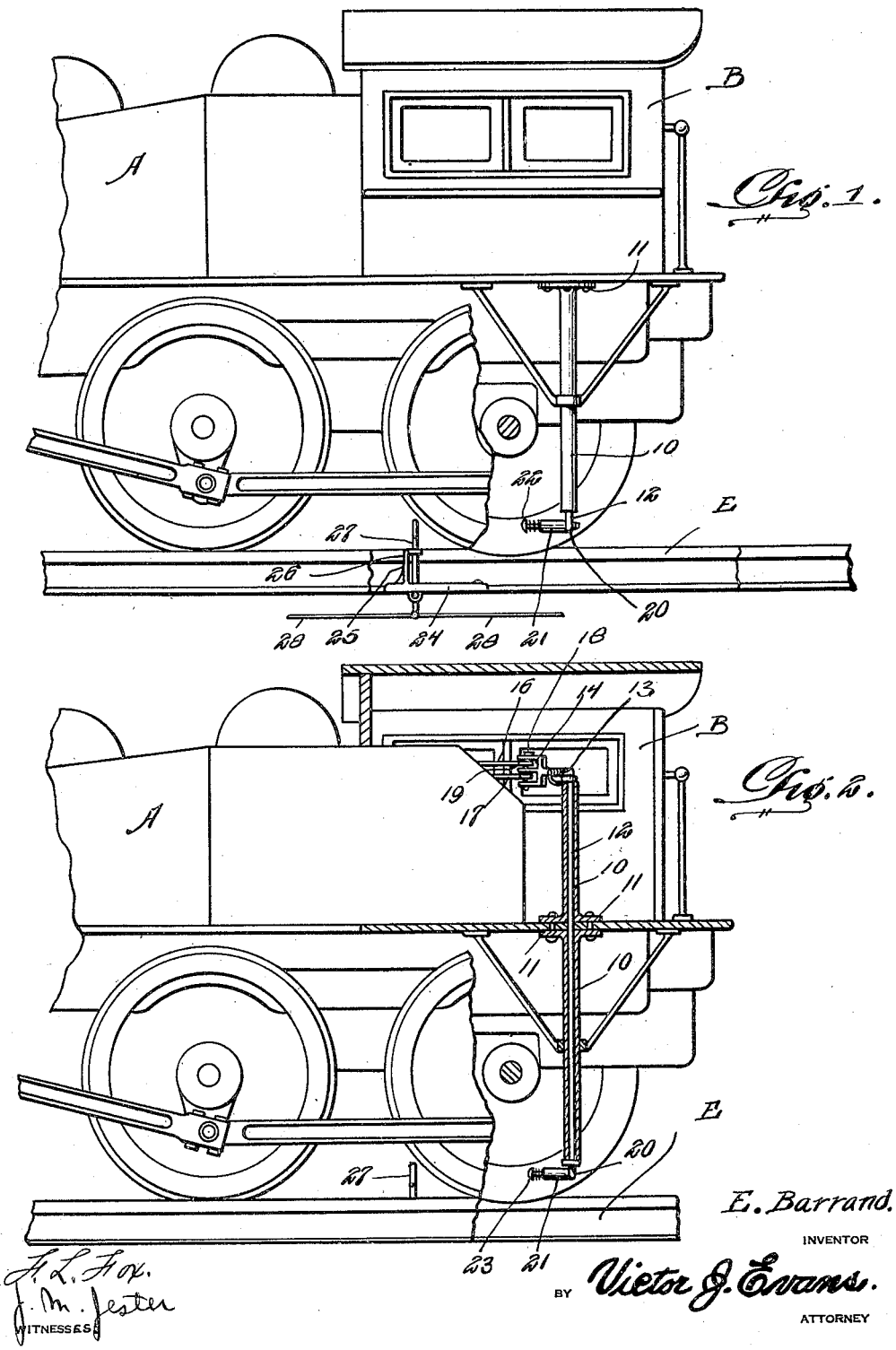

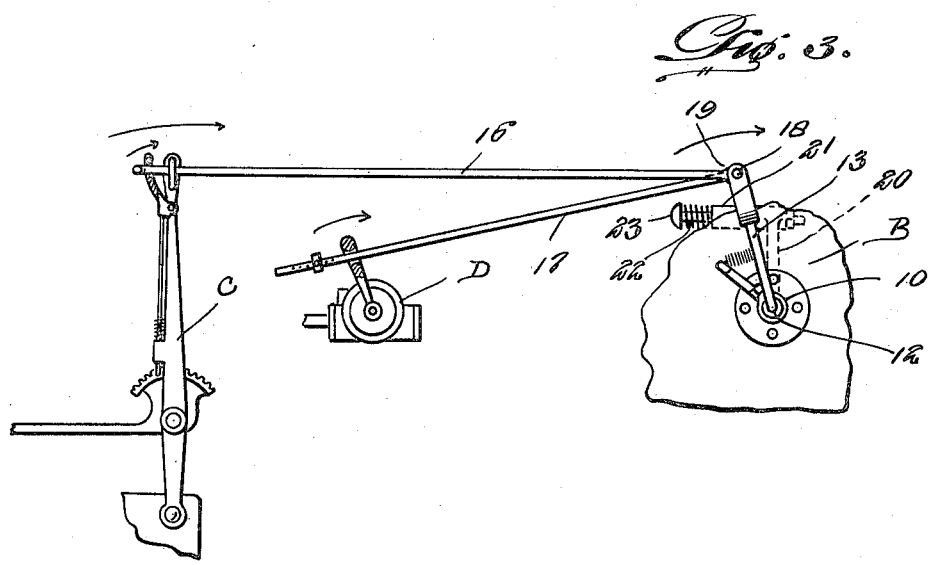
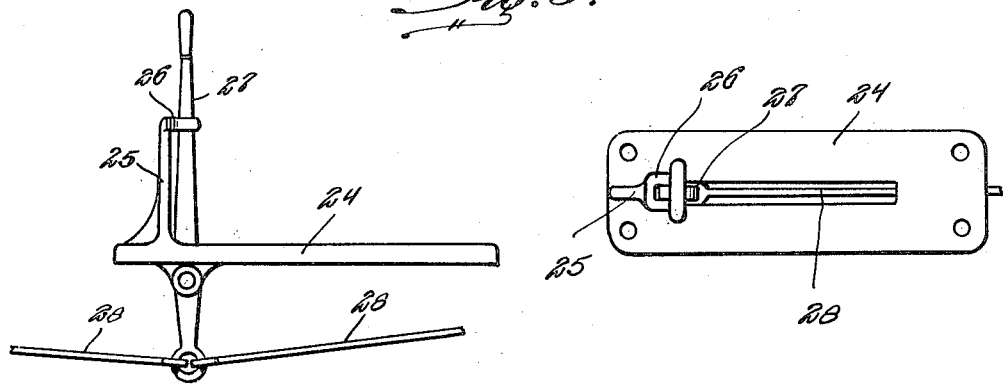
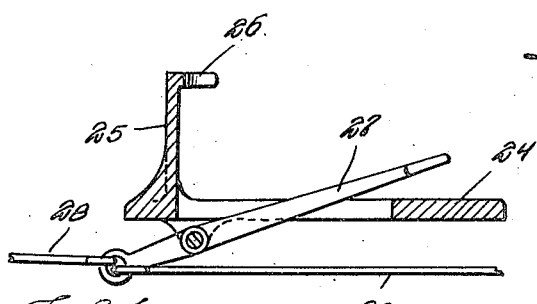

ELDREAD BARRAND, OF HUME-KAKABEKA FALLS, ONTARIO, CANADA.

TRAIN-STOP.

1,373,380.  Specification of Letters Patent.  Patented Mar. 29, 1921.

Application filed October 30, 1920. Serial No. 420,727.

*To all whom it may concern:*

Be it known that I, ELDREAD BARRAND, a subject of the King of Great Britain, residing at Hume-Kakabeka Falls, in the Province of Ontario and Dominion of Canada, have invented new and useful Improvements in Train-Stops, of which the following is a specification.

This invention relates to train control devices and has for its object the provision of a device carried by a locomotive and adapted to be engaged by a trip lever mounted at some desired location upon the trackway whereby engagement of the member carried by the locomotive with the trip lever will result in simultaneous closing of the throttle and opening of the engineer's valve to set the brakes, this action being entirely automatic and not dependent in any way upon any voluntary action on the part of the engineer.

An important object is the provision of a novel trip lever mounted by means of a knee joint and provided with means whereby it may be swung either into operative or inoperative position by a signalman.

Another object is the provision of a device of this character in which the member carried by the locomotive is provided with spring cushioning means designed to reduce the shock of its impact against the trip lever so as to avoid breaking the parts.

An additional object is the provision of a device of this character which will be simple and inexpensive in manufacture and installation, positive in operation, efficient in use, and a general improvement in the art.

With the above and other objects and advantages in view, the invention consists in the details of construction to be hereinafter more fully described and claimed, and illustrated in the accompanying drawings in which—

Figure 1 is a side elevation of a locomotive upon a trackway and showing the member carried by the locomotive and also the trip lever, Fig. 2 is a longitudinal sectional view through the locomotive cab showing my device in side elevation, Fig. 3 is a cross sectional view through a portion of the cab showing my device in front elevation, Fig. 4 is a plan view of the trip lever, Fig. 5 is an enlarged side elevation thereof in operative position, and Fig. 6 is a longitudinal sectional view therethrough in inoperative position.

Referring more particularly to the drawings, the letter A designates a locomotive, and B designates the cab within which is located the usual throttle C and the engineer's brake valve D. The letter E designates the trackway over which the locomotive travels.

In carrying out my invention I provide a vertically disposed tubular guide 10 extending through the floor of the cab and having suitable flanges 11 bolted thereon. This member 10 extends some distance above the cab floor, as clearly shown. Rotatably mounted through the guide 10 is a shaft 12 which has its upper end formed with a lateral extension 13 terminating in forks 14 and 15. Connected within the fork 14 is a rod 16 which is suitably connected with the throttle C and connected within the fork 15 is a similar rod 17 connected with the handle of the brake valve D. The connection of the rods 16 and 17 with the forks is accomplished by means of a suitable bolt 18 passing through the forks and through loops or eyes 19 on the ends of the rods 16 and 17.

The lower end of the shaft 12 is bent laterally, as shown, to form an arm 20 and this arm terminates in or carries a shoe 21 within which is slidable a normally outwardly spring-pressed plunger 22 carrying a head 23. It will be seen that when the shaft 12 is partially rotated the rods 16 and 17 will pull upon the throttle and brake valve handle and cut off the steam and apply the brakes.

In order to effect this movement of the shaft 12 I provide a trip lever located at any desired location on the trackway and this trip lever comprises an elongated slotted plate 24 secured upon the ties by any suitable means and formed with an upwardly extending projection 25 forming a shoulder 26. Pivoted within the slot of this plate 24, is an arm 27 adapted to engage the shoulder 26 whereby to limit its movement and at its lower end this arm 27 has connected therewith wires or rods 28 which may be moved to swing the arm into either vertical or operative position or into substantially horizontal or inoperative position, depending upon whether it is desired to stop the train or not.

In the operation of the device it will be seen that when the locomotive passes over the arm the head 23 of the spring-pressed plunger 22 will engage the arm 27 which will result in backward swinging movement of the shoe 21 and consequent partial rotation of the shaft 12 and this will cause swinging of the extension 13 and pulling upon the rods 16 and 17 for cutting off the steam and applying the brakes. After the device has been operated it is apparent that the parts may be easily restored to normal position.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A train stopping device comprising in combination with the throttle lever an engineer's brake valve, a tubular guide carried by and extending through the floor of a locomotive cab, a shaft journaled through said guide and having its upper end formed with a lateral extension terminating in forks, rods connected within said forks and connected with the throttle lever and brake valve handle respectively, a lateral arm on the lower end of said shaft, a shoe on the end of said lateral arm and formed with a socket, a normally outwardly spring-pressed plunger mounted within said socket and having a head, and a trip lever pivotally mounted upon the trackway and movable to extend into the path of travel of said shoe.

2. A train stopping device comprising in combination with the throttle lever and engineer's brake valve; a tubular guide carried by and extending through the floor of a locomotive cab, a shaft journaled through said guide and having its upper end formed with a lateral extension terminating in a pair of forks, a rod pivotally connected with one of said forks and slidably engaged through the handle of the engineer's brake valve, a stop on said rod engageable with said handle whereby to move said handle when said shaft is rotated in one direction, a rod pivotally connected within the other fork and slidably connected through the handle of the throttle with its terminal connected with the latch associated with the throttle lever, a lateral arm on the lower end of said shaft, a shoe on the end of said lateral arm and formed with a socket, a normally outwardly spring pressed plunger mounted within said socket and having a head, said head being adapted to engage a trip device mounted upon a track way.

In testimony whereof I affix my signature.

ELDREAD BARRAND.